United States Patent
Matsumoto et al.

(10) Patent No.: US 7,938,406 B2
(45) Date of Patent: May 10, 2011

(54) GASKET

(75) Inventors: Tomohisa Matsumoto, Nihonmatsu (JP); Takashi Nakao, Nihonmatsu (JP); Shuji Yoshitsune, Nihonmatsu (JP); Kazuki Takeno, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 674 days.

(21) Appl. No.: 11/988,242

(22) PCT Filed: Jul. 5, 2006

(86) PCT No.: PCT/JP2006/313400
§ 371 (c)(1),
(2), (4) Date: Jan. 3, 2008

(87) PCT Pub. No.: WO2007/007612
PCT Pub. Date: Jan. 18, 2007

(65) Prior Publication Data
US 2009/0115138 A1  May 7, 2009

(30) Foreign Application Priority Data

Jul. 7, 2005  (JP) .................... 2005-198442

(51) Int. Cl.
*F16J 15/02* (2006.01)
*F16J 15/10* (2006.01)

(52) U.S. Cl. ........ 277/637; 277/596; 277/598; 277/648; 277/649

(58) Field of Classification Search .................. 277/598, 277/596, 648, 649, 594, 637
See application file for complete search history.

(56) References Cited

U.S. PATENT DOCUMENTS

| | | | | |
|---|---|---|---|---|
| 1,829,248 A * | 10/1931 | Victor | ............. | 277/598 |
| 2,983,533 A * | 5/1961 | Tisch | ............. | 277/649 |
| 3,052,478 A * | 9/1962 | Horvereid | ......... | 277/394 |
| 3,334,774 A * | 8/1967 | Poltorak | ............ | 220/378 |
| 3,930,656 A * | 1/1976 | Jelinek | ............. | 277/611 |
| 3,936,059 A * | 2/1976 | Gordon | ............ | 277/594 |
| 4,192,520 A * | 3/1980 | Hasegawa | ........ | 277/591 |
| 4,846,482 A * | 7/1989 | Blodgett et al. | ........ | 277/591 |
| 5,375,569 A * | 12/1994 | Santella | ............. | 123/90.38 |
| 5,513,603 A * | 5/1996 | Ang et al. | .......... | 123/90.37 |
| 5,957,100 A * | 9/1999 | Frohwerk et al. | ....... | 123/90.38 |
| 6,269,787 B1 * | 8/2001 | McArthy | ......... | 123/188.6 |
| 6,371,489 B1 * | 4/2002 | Combet et al. | ........ | 277/594 |
| 6,543,787 B1 * | 4/2003 | Inciong | ............ | 277/593 |
| 6,676,135 B2 * | 1/2004 | Carey | ............. | 277/594 |
| 6,824,138 B2 * | 11/2004 | Matsuki | ........ | 277/591 |

(Continued)

FOREIGN PATENT DOCUMENTS

JP          59-175656          11/1984

(Continued)

*Primary Examiner* — Alison K Pickard
(74) *Attorney, Agent, or Firm* — Harness, Dickey & Pierce, P.L.C.

(57) ABSTRACT

A first gasket 10 is placed in a groove formed in a cam cover and seals a gap between a cylinder head and the cam cover. The first gasket 10 includes a pair of seal lips 13 which come into tight contact with the cylinder head and which are provided in parallel to each other, and a plurality of connecting portions 15 which are provided between the pair of seal lips 13, which are connected to each of the seal lips 13, and which hold a distance between the seal lips 13 near the connected portion.

9 Claims, 8 Drawing Sheets

U.S. PATENT DOCUMENTS

| | | | |
|---|---|---|---|
| 6,981,704 B2 * | 1/2006 | Okazaki et al. | 277/638 |
| 7,063,327 B2 * | 6/2006 | Salameh | 277/590 |
| 7,624,993 B2 * | 12/2009 | Kikuchi et al. | 277/641 |
| 2006/0157939 A1 * | 7/2006 | Beutler | 277/313 |
| 2008/0067760 A1 * | 3/2008 | Kikuchi et al. | 277/649 |
| 2008/0290609 A1 * | 11/2008 | Seibert et al. | 277/596 |
| 2010/0044970 A1 * | 2/2010 | Suzuki et al. | 277/592 |
| 2010/0102519 A1 * | 4/2010 | Yoshitsune et al. | 277/641 |

FOREIGN PATENT DOCUMENTS

| | | |
|---|---|---|
| JP | 62-237066 | 10/1987 |
| JP | 8-1093 | 7/1996 |
| JP | 10-148261 | 6/1998 |
| JP | 11-248002 | 9/1999 |
| JP | 2002-340190 | 11/2002 |
| JP | 2003-240122 | 8/2003 |
| JP | 2003-269613 | 9/2003 |

* cited by examiner

GASKET

CROSS-REFERENCE TO RELATED APPLICATIONS

This application is a National Stage of International Application No. PCT/JP2006/313400, filed Jul. 5, 2006. This application claims the benefit of JP 2005-198442, filed Jul. 5, 2005. The disclosures of the above applications are incorporated herein by reference.

FIELD

The present disclosure relates to a gasket which seals a gap between two members.

BACKGROUND

Figure 13:
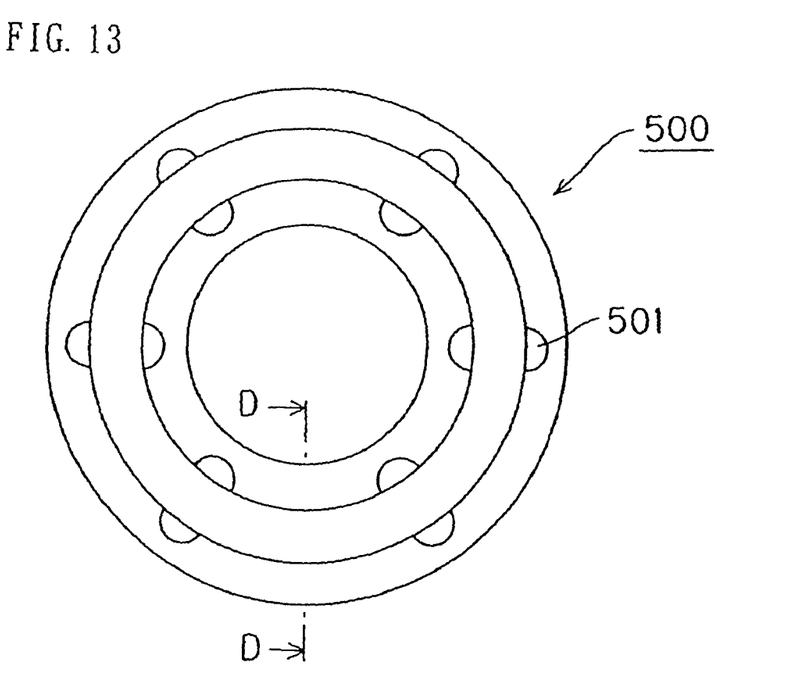
FIG. 13 is a plan view of a conventional gasket.
Figure 14:
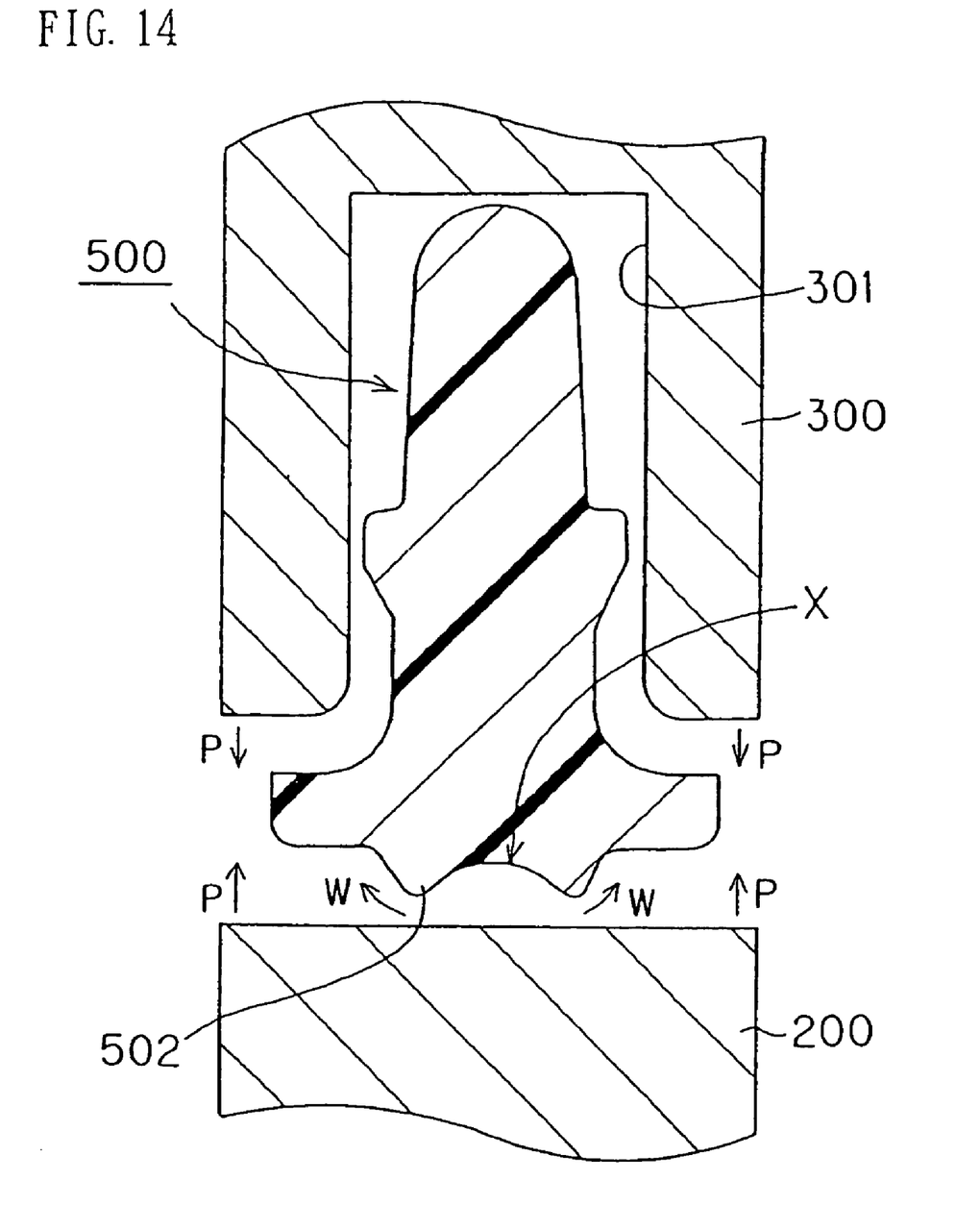
FIG. 14 is a schematic sectional view showing a state where the conventional gasket is placed.
Figure 15:
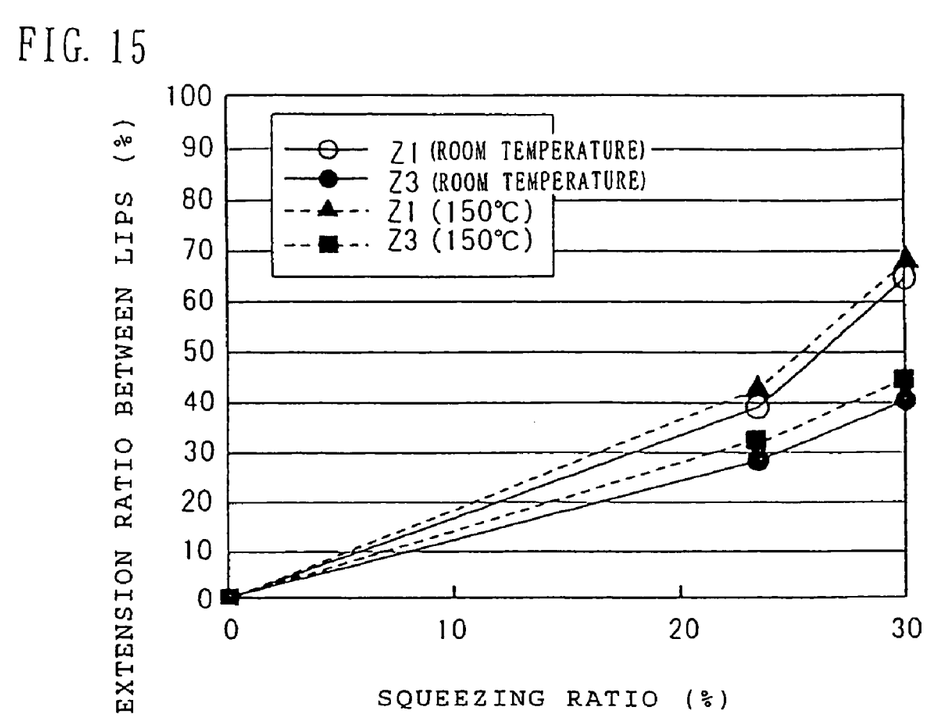
FIG. 15 is a graph showing a relation between the squeezing ratio and the extension ratio between the lips of the conventional gasket.

A conventional example of a gasket which seals a gap between two members will be explained with reference to FIGS. 13 to 15. FIG. 13 is a plan view of a conventional gasket. FIG. 14 is a schematic sectional view showing a state where the conventional gasket is mounted. The gasket shown in FIG. 14 corresponds to cross section taken along the line D-D in FIG. 13. FIG. 15 is a graph showing a relation between a squeezing ratio and an extension ratio between lips of the conventional gasket.

The gasket 500 of the illustrated conventional example is used for sealing a gap between a cylinder head 200 and a cam cover 300. The gasket 500 is placed in a groove 301 formed in the cam cover 300. A plurality of pair of projections 501 are provided on a side surface of a body of the gasket 500 at predetermined distances from one another. The projections 501 are provided for preventing the gasket 500 from bending or falling in the groove 301, and for preventing the gasket 500 from being pulled out from the groove 301. Although FIG. 14 shows the cross section of a portion where the projection 501 is not provided, the pairs of projections 501 abut against both side surfaces of the groove 301. With this, the gasket 500 is positioned in the groove 301.

A pair of seal lips 502 are provided on the gasket 500 on the opposite side from the side placed in the groove 301. The pair of seal lips 502 are provided in parallel to each other, and come into tight contact with the cylinder head 200. Various shapes of the seal surface of the gasket may be employed in general, and the pair of seal lips as in this conventional example are suitable for enhancing the sealing performance.

When the gasket 500 having the above structure is placed, the gasket 500 is compressed in the direction of the arrows P in FIG. 14 between the cylinder head 200 and the cam cover 300. With this compression, a bending moment is applied to the pair of seal lips 502 in the direction of the arrow W in FIG. 14. Therefore, tensile stress is applied to a central portion between the pair of seal lips 502 (near the arrow X in FIG. 14) and stress concentrates on this area.

It is confirmed that the tensile stress becomes greater as a radius of curvature of the gasket 500 is smaller, and the tensile stress becomes greater at a location where the pair of projections 501 are not provided as compared with a location where the pair of projections 501 are provided. This point will be explained below.

Using an FEM analysis, tensile stress near the central portion between the pair of seal lips (near the arrow X in FIG. 14), when compressed with a predetermined pressure, of each of the following gaskets having the same cross section shape and size was measured: a gasket having a radius of curvature of 9.25 mm (having a shape shown in FIG. 13 and its outer diameter is 18.5 mm), a gasket having a radius of curvature of 18.45 mm (having a shape shown in FIG. 13 and its outer diameter is 36.9 mm), and a gasket having an infinite radius of curvature (straight). As a result, the tensile stresses of these gaskets were 1.1 MPa, 0.78 MPa and 0.45 MPa, respectively.

It is conceived that as the radius of curvature becomes smaller, the tensile stress becomes greater because as the radius of curvature becomes smaller, an amount of deformation becomes greater.

An area where the pair of projections 501 are provided and an area where the pair of projections 501 are not provided are compared with each other. FIG. 15 shows a result thereof.

Squeezing ratio(%)of lateral axis=(squeeze÷height before compression)×100={(height before compression−groove depth)÷height before compression}×100, and extension ratio(%)between lips of vertical axis={(distance between lips at the time of compression−distance between lips before compression)÷distance between lips before compression)×100.

A graph shown in FIG. 15 shows results of analyses carried out under an environment at room temperature environment and under an environment at 150° C. at an area (a center area (e.g., near the D-D cross section in FIG. 13) of the pair of adjacent projections 501) Z1 where the projections 501 are not provided, and an area Z3 where the pair of projections 501 are provided.

From the above points, the stress concentration near the center of the pair of seal lips was higher around the area where the radius of curvature was small (circular gasket as shown in FIG. 13 for example and its outer diameter was about 30 mm or less) and the pair of projections 501 are not provided, and a crack was generated in some cases. Although a crack is generated, sealing fluid does not leak immediately. However, there is a possibility that the sealing performance or durability is deteriorated, and such a crack is not preferable.

Patent document 1: Japanese Patent Application Laid-open No. 11-248002
Patent document 2: Japanese Patent Application Laid-open No. 2003-240122
Patent document 3: Japanese Patent Application Laid-open No. 2003-269613

SUMMARY

The present disclosure provides a gasket in which a crack is prevented from being generated between seal lips and sealing performance is enhanced.

According to the present disclosure, there is provided a gasket which is placed in a groove formed in one of two members and which seals a gap between the two members, comprising a pair of seal lips which come into tight contact with the other one of the two members and which are provided in parallel to each other; and a plurality of connecting portions which are provided between the pair of seal lips, which are connected to each of the seal lips, and which hold a distance between the seal lips near a connected portion.

According to the present disclosure, a distance between the seal lips is maintained in an area where connection is established by the connecting portion. With this, it is possible to prevent the seal lip from deforming at the time of mounting operation.

The gasket may be provided at its side surface with a plurality of pairs of projections which abut against both side surfaces of the groove, wherein the connecting portion is provided at a central portion between adjacent pairs of projections. With this, it is possible to prevent the seal lip from deforming in an area where the seal lip is most prone to deform.

The connecting portion may include a flat surface portion which comes into tight contact with the other one of the two members, wherein the flat surface portion and tip ends of the pair of seal lips are flush with each other. With this, it is possible to prevent the seal lip from deforming more reliably.

A lateral width of the connecting portion is equal to or greater than a distance between the pair of seal lips. With this, it is possible to prevent the seal lip from deforming more reliably.

These structures may be combined as many as possible and such a combination may be employed.

As explained above, according to the present disclosure, deformation of the seal lips is suppressed, and concentration of stress between the seal lips may be suppressed. With this, it is possible to prevent a crack from being generated between the seal lips and the sealing performance may be enhanced.

DETAILED DESCRIPTION

The best mode for carrying out the present teachings will be explained in detail by way of example based on embodiments with reference to the drawings. The scope of the present teachings is not limited to size, material, shape and relative disposition of constituent parts described in the embodiments unless otherwise specified.

A gasket of an embodiment of the present teachings will be explained with reference to FIGS. 1 to 12.

<Entire Gasket>

Figure 1:
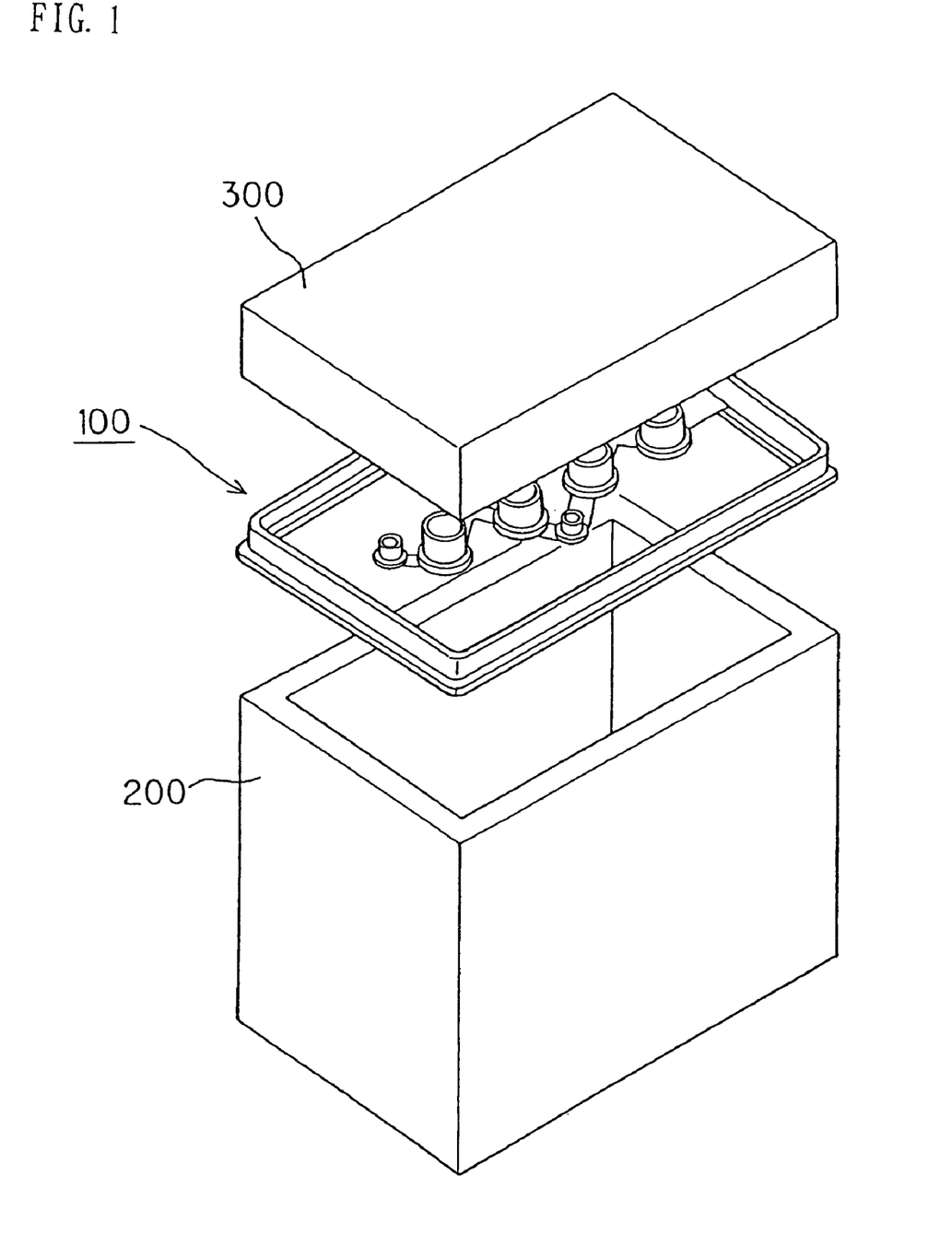
FIG. 1 is a development perspective view of parts showing a state before a gasket is placed.
Figure 2:
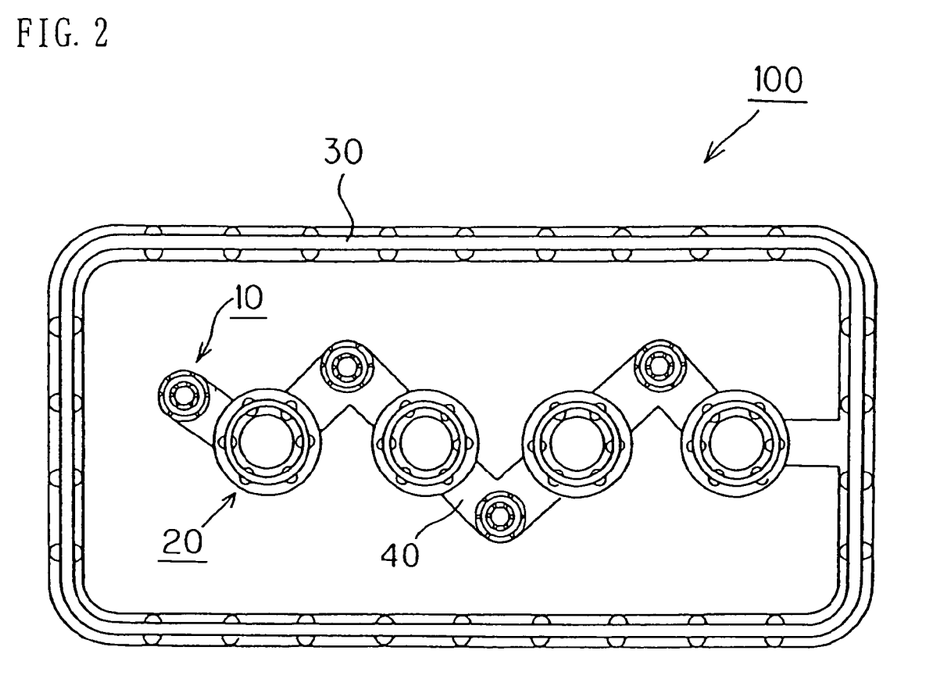
FIG. 2 is a plan view of the gasket.
Figure 3:
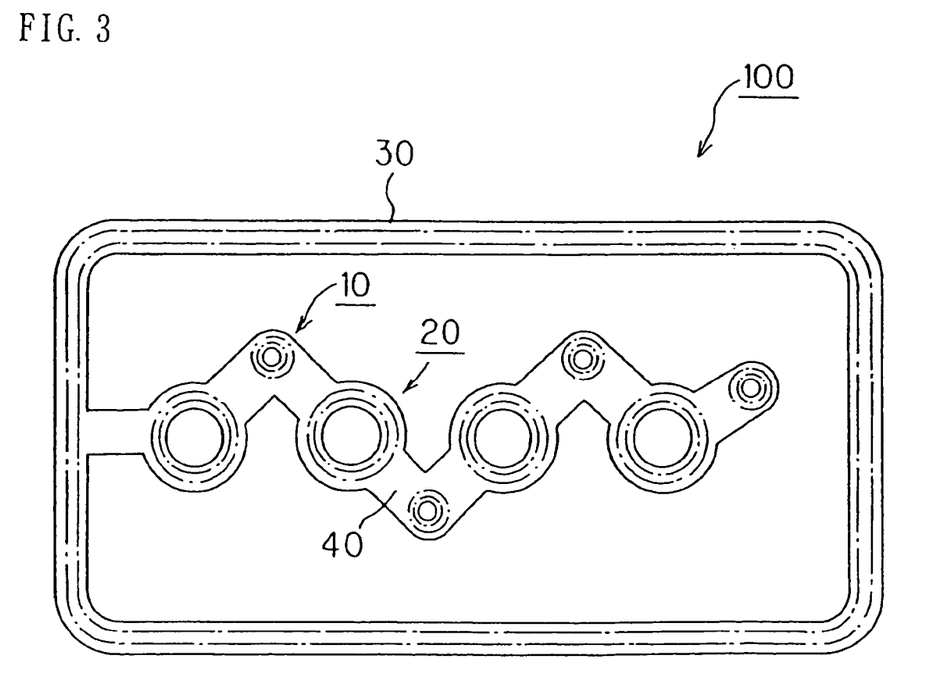
FIG. 3 is a bottom view of the gasket.

The entire gasket will be explained with reference especially to FIGS. 1 to 3. FIG. 1 is a development perspective view of parts showing a state before a gasket is placed. FIG. 2 is a plan view of the gasket according to the present teachings. FIG. 3 is a bottom view of the gasket according to the present teachings.

The gasket 100 may be used for sealing a gap between a cylinder head 200 and a cam cover 300. In FIG. 1, various kinds of parts disposed in the cylinder head 200 are omitted.

The gasket 100 includes first gaskets 10 for sealing ignition coil portions, second gaskets 20 for sealing ignition coil bolt portions, a third gasket 30 for sealing outer frame portions of the cylinder head 200 and the cam cover 300, and a linking portion 40 for connecting these members. The first gaskets 10, the second gaskets 20, the third gasket 30 and the linking portion 40 are integrally formed, and the gasket 100 is constituted as one part.

Here, the second gasket 20 has relatively large outer diameter, and most portions of the third gasket 30 are straight, each of curved portions thereof has large radius of curvature and thus, a large stress concentration is not generated between a pair of seal lips. On the other hand, the first gasket 10 has a small outer diameter and thus, a stress is prone to concentrate on a portion between the pair of seal lips. Hence, the gasket 100 of the embodiment is formed such as to suppress the stress concentration. This point will be explained in detail below.

<Details of First Gasket>

Figure 4:
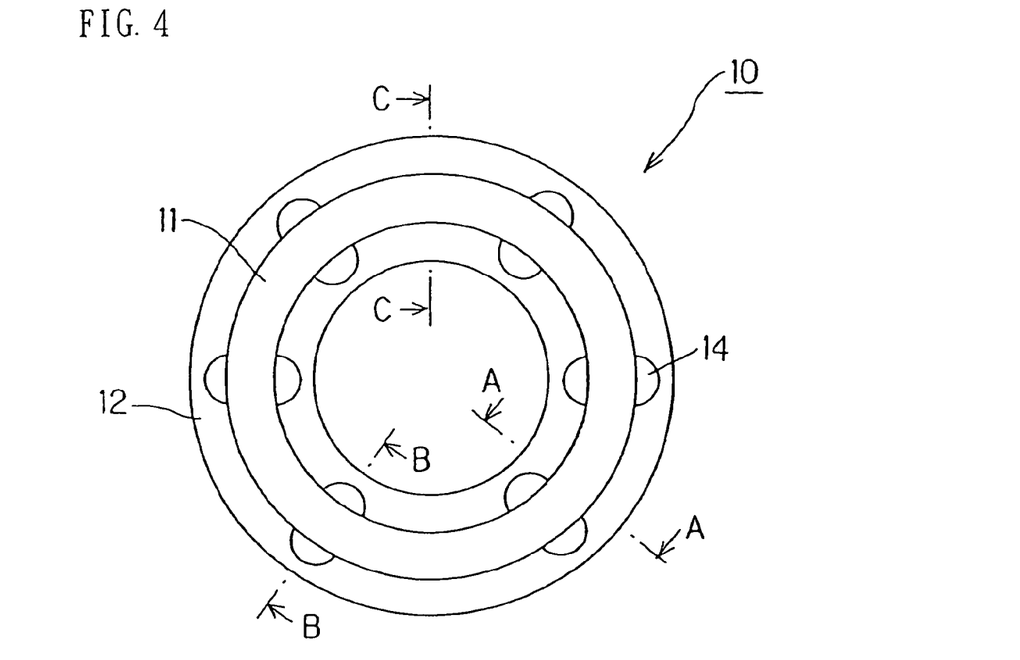
FIG. 4 is a plan view of a first gasket.
Figure 5:
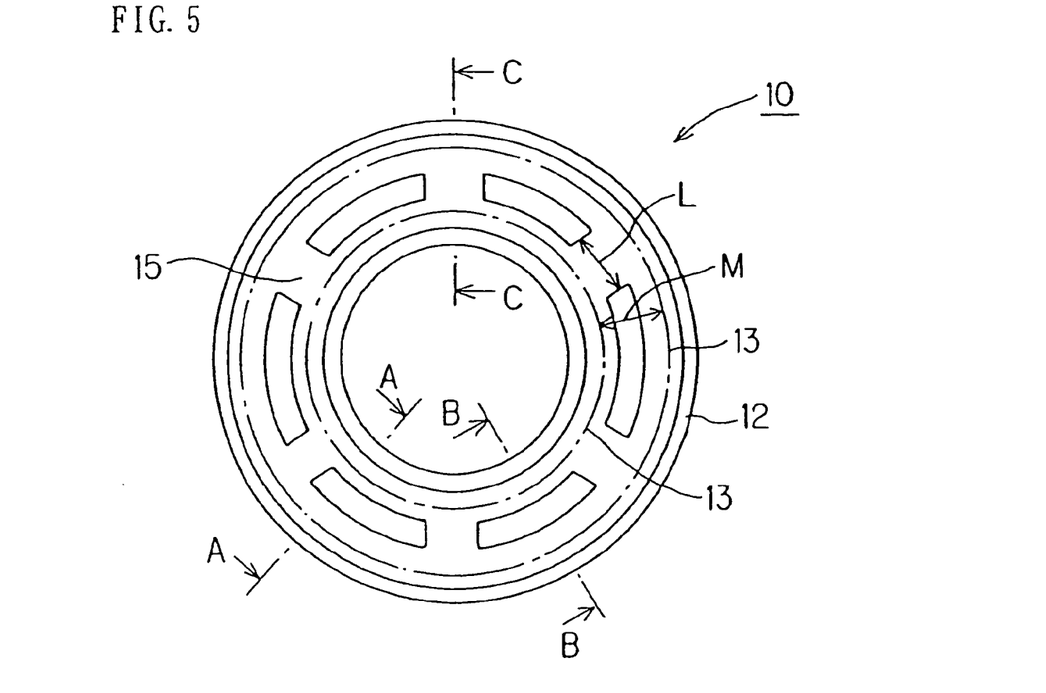
FIG. 5 is a bottom view of the first gasket.
Figure 6:
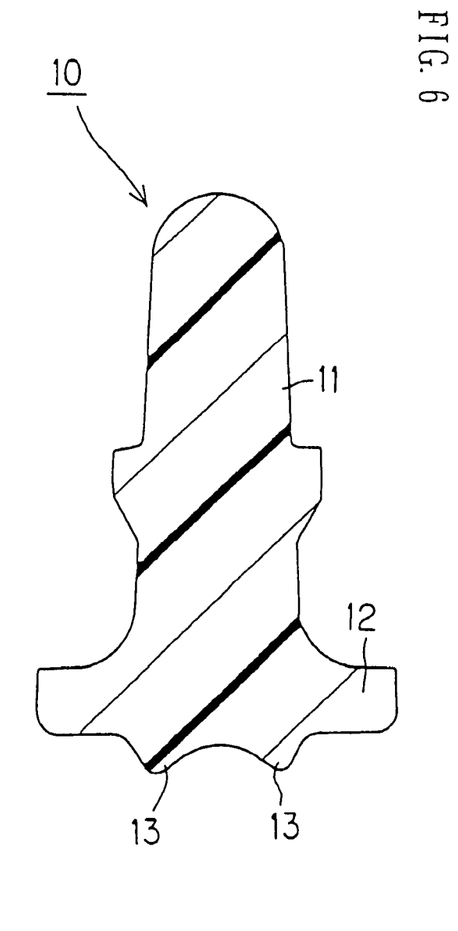
FIG. 6 is a sectional view taken along the A-A lines in FIGS. 4 and 5.
Figure 7:
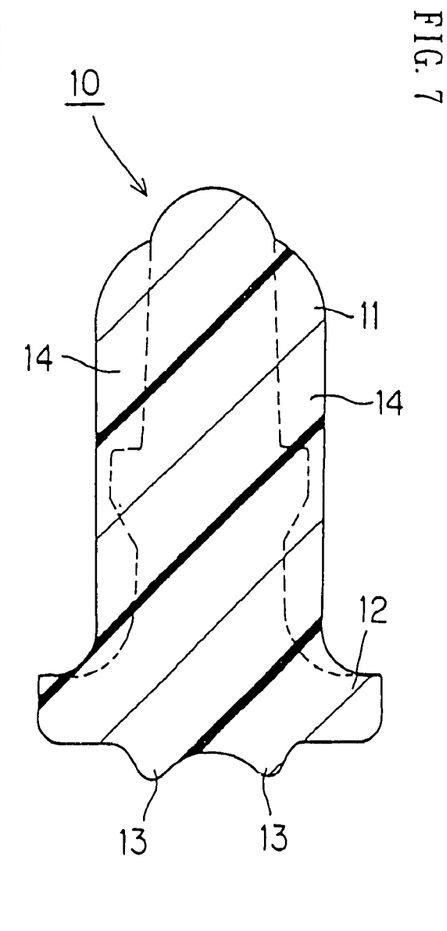
FIG. 7 is a sectional view taken along the B-B lines in FIGS. 4 and 5.
Figure 8:
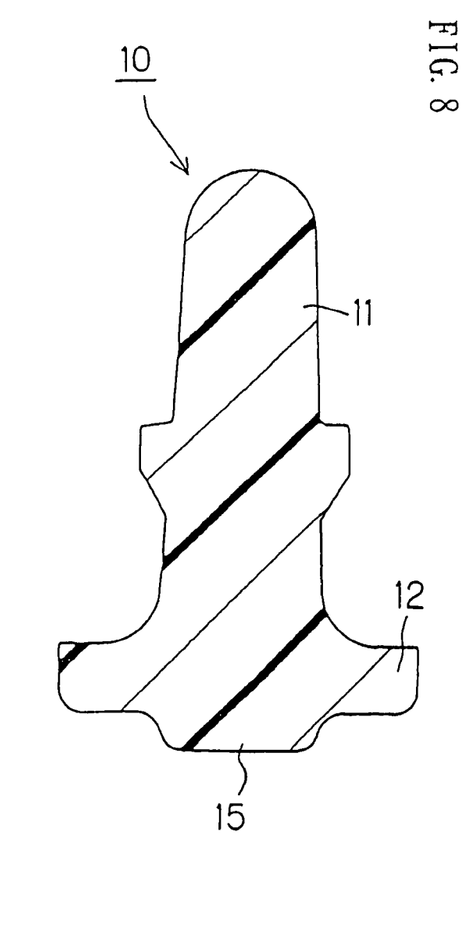
FIG. 8 is a sectional view taken along the C-C lines in FIGS. 4 and 5.
Figure 9:
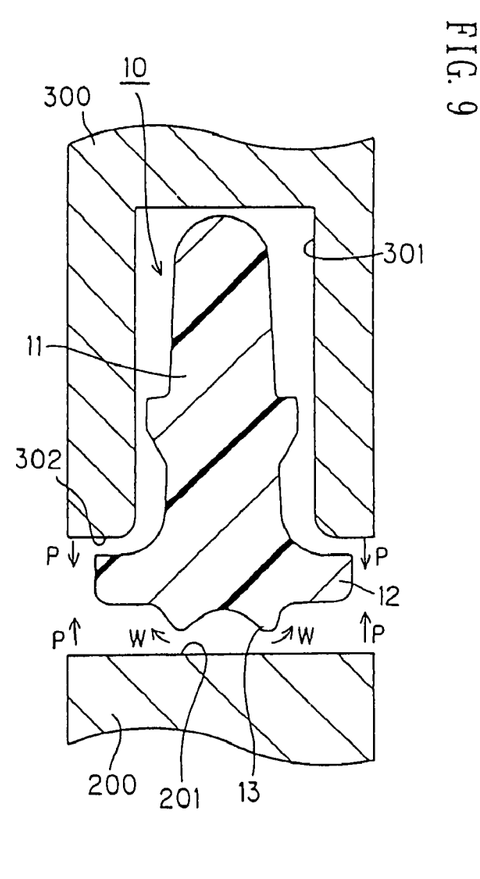
FIG. 9 is a schematic sectional view of a state where the gasket is being placed.
Figure 10:
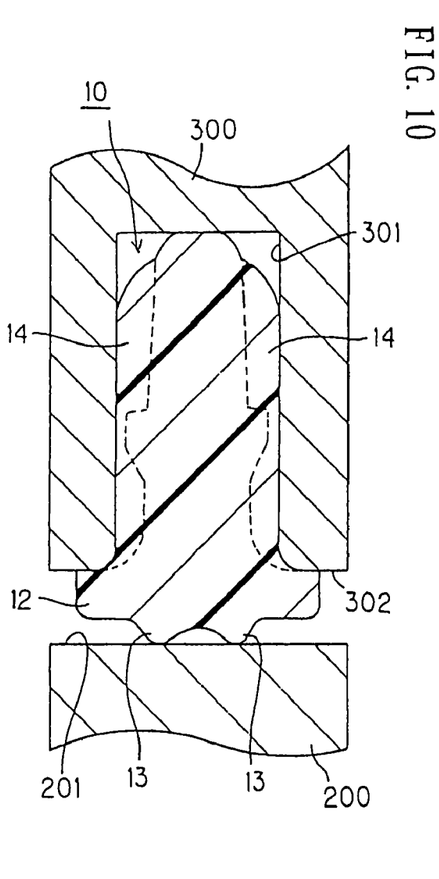
FIG. 10 is a schematic sectional view of a state where the gasket is placed.
Figure 11:
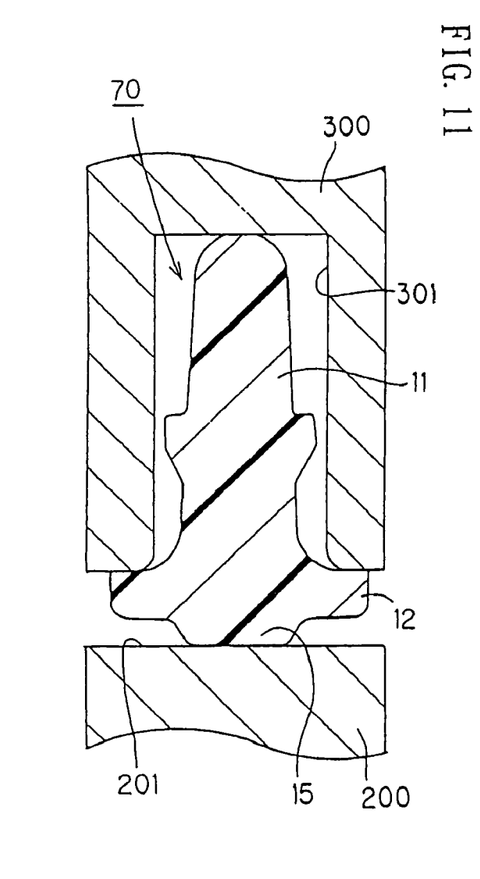
FIG. 11 is a schematic sectional view of a state where the gasket is placed.

The first gasket 10 will be explained in detail with reference to especially FIGS. 4 to 11. FIG. 4 is a plan view of a first gasket according to the present teachings. FIG. 5 is a bottom view of the first gasket according to the present teachings. In FIGS. 4 and 5, only portions of the first gasket 10 are shown and the linking portion 40 is not shown. FIG. 6 is a sectional view taken along the A-A lines in FIGS. 4 and 5. FIG. 7 is a sectional view taken along the B-B lines in FIGS. 4 and 5. FIG. 8 is a sectional view taken along the C-C lines in FIGS. 4 and 5. FIG. 9 is a schematic sectional view of a state where the gasket is being placed. The sectional view of the first gasket in FIG. 9 corresponds to the sectional view of FIG. 6. FIGS. 10 and 11 are schematic sectional views of a state where the gasket is placed. The sectional view of the first gasket in FIG. 10 corresponds to the sectional view of FIG. 7. The sectional view of the first gasket in FIG. 11 corresponds to the sectional view of FIG. 8.

The first gasket 10 includes a body 11, a flat plate 12 provided on one end side of the body 11, and a pair of seal lips 13 which are provided on a surface of the flat plate 12 opposite from the body 11 and which are in parallel to each other. A plurality of pairs of (six, in this embodiment) projections 14 are provided on side surface of the body 11 of the first gasket 10 at constant distances from one another. The first gasket 10 is also provided with connecting portions 15 in a central portion between the adjacent pairs of projections 14. Each connecting portion 15 connects the pair of seal lips 13 to each other.

FIGS. 6 and 9 are sectional views of portions where the projections 14 and connecting portions 15 do not exist. FIGS. 7 and 10 are sectional views of portions of the projections 14. FIGS. 8 and 11 are sectional views of portions of the connecting portions 15.

The body 11 is placed in a groove 301 for an ignition coil bolt provided in the cam cover 300. A tip end of the body 11 placed in the groove 301 comes into tight contact with a bottom surface of the groove 301. Portions of the flat plate 12 projecting on both sides of the body 11 are sandwiched between an end surface 302 of the cam cover 300 and an end surface 201 of the cylinder head 200. The pair of seal lips 13 come into tight contact with the end surface 201 of the cylinder head 200. The pair of seal lips 13 are provided over the entire circumference along the periphery of the gasket 10.

The pair of projections 14 abut against both side surfaces of the groove 301. This prevents the first gasket 10 from bending or falling in the groove 301, and prevents the first gasket 10 from being easily pulled out from the groove 301.

A surface of the connecting portion 15 is a flat surface. Tip ends of the flat surface portion and the seal lip 13 are flush with each other. Therefore, the flat surface portion of the connecting portion 15 comes into tight contact with the end surface 201 of the cylinder head 200. If a width of the connecting portion 15 is defined as L and a distance between the pair of seal lips 13 is defined as M (see FIG. 5), L≧M. With this, the strength of the connecting portion 15 is sufficient, and even when the gasket is placed (compressed), the distance between the pair of seal lips 13 is not varied around a place where they are connected to each other through the connecting portion 15.

In this embodiment also, a portion of the first gasket 10 having no connecting portion 15 is compressed in the arrow P direction in FIG. 9 by the cylinder head 200 and the cam cover 300 when the first gasket 10 is placed as shown in FIG. 9, and a bending moment in the arrow W direction in the drawing is applied to the pair of seal lips 13. However, a portion of the first gasket 10 of the embodiment which is connected by the connecting portion 15 is held such that the distance between the pair of seal lips 13 is not varied. The plurality of (six) connecting portions 15 are provided at constant distances from one another, and the deformation of the seal lip 13 is suppressed at a plurality of portions. Therefore, the deformation of the entire seal lip 13 is also suppressed. Thus, the stress concentration between the pair of seal lips 13 may be suppressed, and it is possible to prevent a crack from generating between the seal lips 13.

Since the surface of the connecting portion 15 is the flat surface which is flush with the tip end of the seal lip 13, a stress does not center on a portion of the connecting portion 15 corresponding to a portion between the pair of seal lips 13. The connecting portion 15 is located at a central portion between the adjacent pairs of projections 14 where the seal lip 13 is most prone to deform and thus, it is possible to suppress the deformation of the seal lip 13 effectively. Since the width L of the connecting portion 15 is equal to or greater than the distance M between the pair of seal lips 13, the strength of the connecting portion 15 is sufficiently high, and it is possible to more reliably prevent the distance between the pair of seal lips 13 from varying near a portion where they are connected to each other through the connecting portion 15.

Figure 12:
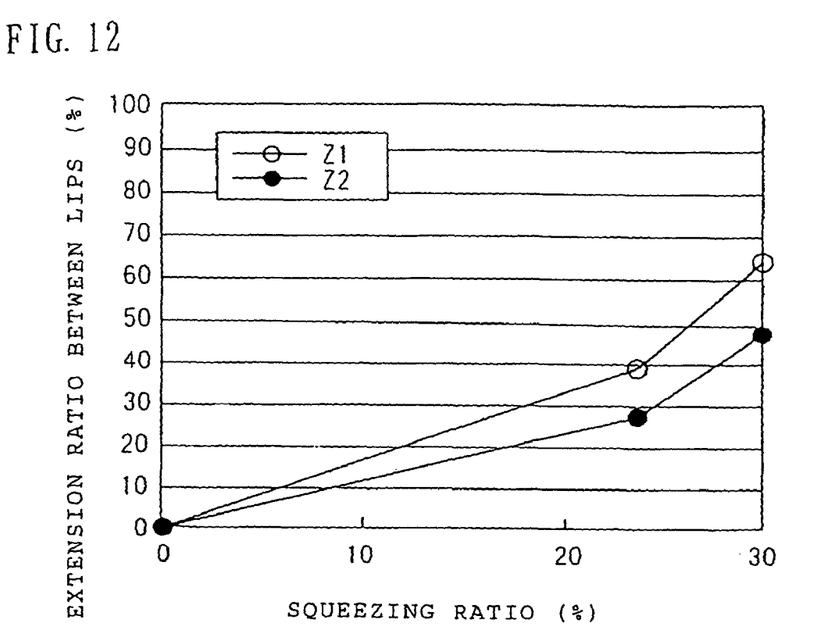
FIG. 12 is a graph showing a comparison between a conventional example and the embodiment concerning a relation of extension ratio between lips with respect to a squeezing ratio.

FIG. 12 is a graph showing a comparison between a conventional example and the embodiment concerning a relation of extension ratio between lips with respect to a squeezing ratio. In the drawing, a reference symbol Z1 denotes a result of analysis concerning a portion (near the central portion between the pair of projections) where it is expanded most when the gasket is placed in a gasket (conventional gasket) having no connecting portion, and a reference symbol Z2 denotes a result of analysis concerning a portion (near the central portion between the connecting portion 15 and the projection 14) where it is expanded most when the gasket is placed in the gasket (present embodiment) having the connecting portion. From this graph, it may be found that if the connecting portion 15 is provided, the extension ratio may be reduced, and the deformation of the seal lip 13 may be suppressed.

<Others>

Although the three kinds of gaskets (first gasket 10, second gasket 20 and third gasket 30) are integrally formed together through the linking portions in the embodiment, the present invention may be applied to a case where these gaskets are separated from each other.

Although the gasket seals the gap between the cylinder head and the cam cover in the embodiment, a portion to which the gasket is applied is not limited to this. The gasket of the present disclosure may be applied to various kinds of apparatuses such as an automobile, its auxiliary machine, a general industrial machine, and a household electrical appliance.

Although the shape of the gasket is circular, and the gasket having a small outer diameter is provided with the connecting portion in the embodiment, the shape of the gasket to which the present disclosure may be applied is not limited to this. The present teachings are especially effective if it has a small radius of curvature, but effect may be exhibited irrespective of magnitude of the radius of curvature if the seal lip is prone to deform.

What is claimed is:

1. A gasket which is placed in a groove formed in one of two members and which seals a gap between the two members, comprising:
    a pair of seal lips which come into tight contact with the other one of the two members and which are provided in parallel to each other; and
    a plurality of connecting portions which are provided between the pair of seal lips, which are connected to each of the seal lips, and which hold a distance between the seal lips near each connected portion,
    wherein the connecting portions each include a flat surface portion that comes into tight contact with the other one of the two members, and the flat surface portion and tip ends of the pair of seal lips are flush with each other.

2. The gasket according to claim 1, wherein the gasket is provided at its side surface with a plurality of pairs of projections which abut against both side surfaces of the groove, and the connecting portions are provided at a central portion between adjacent pairs of projections.

3. The gasket according to claim 1, wherein a lateral width of each of the connecting portions is equal to or greater than a distance between the pair of seal lips.

4. A gasket comprising:
    a plurality of first gaskets;
    a plurality of second gaskets;
    a third gasket; and
    a plurality of linking portions that connect said first gaskets, said second gaskets, and said third gasket,
    wherein each of said plurality of first gaskets includes a pair of seal lips that are provided in parallel to each other; and
    a plurality of connecting portions are provided between and connected to the pair of seal lips, the connecting portions holding a distance between the seal lips near each connected portion,
    wherein the connection portions each include a flat surface portion that is flush with tip ends of the pair of seal lips.

5. The gasket according to claim 4, wherein each of the first gaskets include a plurality of pairs of projections, and the connecting portions are provided at a central portion between adjacent pairs of projections.

6. The gasket according to claim 4, wherein a lateral width of each of the connecting portions is equal to or greater than a distance between the pair of seal lips.

7. A gasket which is placed in a groove formed in one of two members and which seals a gap between the two members, comprising:
    an annular body extending axially between the two members, the annular body having a pair of seal lips that come into tight contact with the other one of the two members and which are provided in parallel to each other around an entire circumference of the body; and a plurality of connecting legs that are intermittently provided between the pair of seal lips around the circumference of the body, each connecting leg extending radially between the seal lips, and holding a distance between the seal lips, wherein each connecting leg includes a flat surface that comes into tight contact with the other one of the two members, and the flat surface and tip ends of the pair of seal lips are flush with each other.

8. The gasket according to claim 7, wherein the gasket is provided at its side surface with a plurality of pairs of projections which abut against both side surfaces of the groove, and the connecting legs are provided at a central portion between adjacent pairs of projections.

9. The gasket according to claim 7, wherein a lateral width of each of the connecting legs is equal to or greater than a distance between the pair of seal lips.

* * * * *